Patented May 18, 1937

2,080,408

UNITED STATES PATENT OFFICE 2,080,408

SULPHUR STABILIZATION AND PRESERVATION

John B. Ceccon, San Francisco, Calif., assignor to San Francisco Sulphur Company, a corporation of California No Drawing. Application October 2, 1936, Serial No. 103,716

5 Claims. (Cl. 23—243)

This invention relates to the production of a very finely divided sulphur and to the protection thereof. For use in insecticidal and fungicidal dusts sulphur is desired in a finely divided form in which it is free flowing. This has heretofore been accomplished by incorporating mechanically materials which serve as diluents in the sulphur, as lime, bentonite or magnesium carbonate, in amounts as high as 10% by volume and higher. This practice resulted in mixtures in which the percentage of sulphur was lowered by the diluent. This practice is not entirely acceptable to the trade which desires as close to a 100% product as is practicable, usually at least 99.5%, because of ease in handling and for other reasons, as higher toxicity.

As a result of extensive research, I have found that it is possible to produce a form of sulphur which remains free flowing even though stored under such unfavorable conditions as in a damp atmosphere and under pressure. Briefly this sulphur is obtained by incorporating or forming in the mass of sulphur, preferably when it is molten, a material which hastens sulphur crystallization and thoroughly distributing the added material through the sulphur. The molten sulphur is then permitted to cool, after which it is comminuted. The added material or materials do not exceed 0.5%, usually less, though as much as 1% can be used. However, the smallest percentage requisite to the end in view is usually best, since then the final mass has a higher sulphur content.

Microscopic examination of sulphur produced in accordance with this invention reveals that it is microcrystalline. This microcrystalline sulphur remains such and crystal growth does not seem to occur to any determinable extent. In other words, it is in a form in which the crystals are aborted and intergrown, not oriented, while the whole mass is somewhat vesicular and has a very irregular cleavage. Heretofore, sulphur has been produced which apparently lacked any crystalline form but which, after a period of time, reverted to a true crystalline structure. This sulphur had a high percentage of carbon bisulphide insoluble fraction. Some finely divided sulphurs, initially free flowing to a degree, exhibited this same crystal growth phenomena upon standing.

As an explanation for what I have determined, I now believe, without limiting myself thereto, that the materials I have found useful, control the inner kinetics of the solidifying fluid melts. Such control affects the formation and rate of growth of crystal nuclei; in achieving the results I seek, this control acts by increasing the resistance to the forces tending to bring the particles into the arrangement characteristic of the crystal so that the sulphur is obtained in a condition closely approximating the colloidal state. In actual practice I find the sulphur has a cryptocrystalline form with a few individuals incompletely developed, interlocked and unoriented, surrounded by non-crystalline masses. This is a colloidal phenomena comparable to colloidal protection.

The main action of my materials is one of accelerating crystallization and inhibiting crystal growth. When the cooling rate must be rapid it is an indication that the accelerator added to the sulphur does not possess the same order of crystallization accelerating power and crystal growth inhibiting power as a material not requiring cooling of the mass at a rapid rate. The materials which I add hasten crystallization so that the sulphur crystals are so fine that they run freely. Crystallization of the sulphur is accelerated by the materials of the present invention to such an extent that the sulphur approaches the amorphous state in crystal size.

For many uses a very finely divided sulphur is desired. Heretofore, sulphur has only been ground so that 95% was smaller than 147 microns and would pass a 100 mesh screen. Such a sulphur contained little if any sulphur smaller than 5 microns. I have made a sulphur in which over 98% will pass a 300 mesh screen while 100% will pass a 200 mesh screen; this sulphur was over 99% pure and remained free flowing. If previous sulphurs were milled to attempt production of such fine material, they were not free flowing, became lumpy on storage, and milled with difficulty.

It is an object of this invention to provide a very finely divided but nevertheless stable sulphur.

Another object of this invention is to provide a free flowing sulphur of high purity, over 99%.

Another object of the invention is to stabilize a form of sulphur so that it remains free flowing.

A further object is to provide a process for the production of stable but very finely comminuted sulphur, and, as an adjunct, a free flowing stable comminuted sulphur.

The invention possesses other features and objects of advantage, some of which, with the foregoing, will appear in the detailed instructions as to the present preferred form of the invention.

In practicing my invention, I have taken a quantity of sulphur and heated it up to about 140° C. so that it was molten. The sulphur was preferably one of good quality initially so that it was ready for manufacture into a comminuted form. The material added is preferably incorporated slowly into the sulphur with stirring so that little if any is vaporized or otherwise lost, since only a small volume is added. After the added material is incorporated, the sulphur is permitted to cool at the desired rate. It is then comminuted, at a desired temperature, usually by dry grinding in a Raymond mill or comparable equipment until it is finely divided. The sulphur of my invention can be ground very fine, and I have made sulphur over 99% pure, in which better than 98% was smaller than 300 mesh and 100% was smaller than 200 mesh. This remained free flowing and milled with ease. This proportion, 2% larger than 300 mesh and 98% smaller, is an excellent one for the material is quite free flowing.

Instead of adding the material to the molten sulphur, it can be melted up with the sulphur. However, I deem this less desirable, since some of the added material, a small quantity at the outset, is apt to be lost mechanically or by vaporization. Because of this last reason also I prefer that the material added, if liquid, be one that has a boiling point somewhat above that temperature of the molten sulphur when the material is added, or, if solid, has a melting point close to the melting point of sulphur, for otherwise vaporization losses are too high and too uncertain. The material can be added hot or cold.

As compounds I mention aniline, benzanilide, benzophenone oxime, camphoroxime and the reaction product of aniline and resin. These compounds, when mixed into molten sulphur in amounts of 1% and less (usually about 0.5%), gave excellent results.

The foregoing materials are merely representative of a vast number of other materials useful in rendering sulphur free flowing. The class determinants are that the material be a base, a carbocyclic organic compound having a boiling point close to or above that temperature at which sulphur becomes a liquid, 120° C.

The material should also have a solvent-solute relation with the sulphur.

It is to be remarked that the protector apparently has little effect on the carbon disulphide insoluble fraction, at least within the contemplation of this invention. In fact, my present information shows that the longer the sulphur stands after manufacture, the greater this percentage becomes, although it never exceeds a few percent, usually not more than 1%; when just ground this fraction is generally much less than 1%. Apparently, therefore, there is little if any amorphous sulphur formed under the conditions existing in my process, for this form of sulphur is largely insoluble in carbon disulphide. In practice, most of my tests were conducted on ton batches of sulphur, which were allowed to cool by standing under atmospheric conditions under control so that the mass would be at about atmospheric temperature (18° C.) after from two and a half to six days.

Using a standard grade of fine sulphur now on the market as a comparison, (that disclosed in the Wieder Patent No. 1,908,619 of May 9, 1933), all sulphurs made by me with the foregoing materials showed an improved efficiency on test for adhesiveness, in several cases as much as 20%.

On test for packing during storage, tests show that all sulphurs including the aforementioned materials were better than sulphur alone, although some of the manufactured sulphurs were better than others. This packing test is an excellent one to use to determine the free flowing quality for if the sulphur packs and balls on storage, it is not free flowing. The present sulphurs, made in accordance with this invention, compared favorably with the material of the aforementioned Wieder patent, which was the best commercial material prior to this invention. A free flowing sulphur is one which flows like water and is free of lumps and balls of sulphur.

In some instances, when two or more materials are used as accelerators, it is probable that a reaction product can be formed by them in the hot sulphur, and that this product becomes the accelerator. In some cases the joint action of materials herein set forth, or of materials herein enumerated with others, is superior to the action alone of any one of the materials used. Also, I wish to point out the likelihood of a reaction between the material added and the sulphur, the possibility of the formation of various sulphur compounds with the sulphur, including the sulphonic acids, which are useful as accelerators.

Stabilization, as effected by my invention, is not to be confused with any prior art incorporation of oils such as olive oil, castor oil, linseed oil, paraffine and the like, which I have tested and found unsuitable, giving results in no way comparable to those I attain unless olefines were cracked and reacted to form olefine polysulphides.

I wish to point out that several factors have entered into selection of materials specifically recited as protectors. These are: first, liquids or finely divided solids chosen because of ease in mixing with the sulphur. Mechanical mixing of two solids is either heterogeneous or too high in cost if homogeneity is to be secured. Substances which have a certain amount of solvent-solute relation with sulphur or are miscible therewith are considered most suitable. To avoid vapor losses, materials of high boiling point are preferred.

Second, cost has to be considered, as well as sulphur purity. To be effective, less than 0.5% of the added material or materials should be required and a limit of ten cents per sack was arbitrarily set as the cost limit in my research.

Third, materials of a poisonous nature or harmful to life are objectionable for obvious reasons.

Fourth, manufacturing requirements and safety require the use of a non-inflammable material.

These reasons only affect the practical phases of the problem, the economics and manufacturing; merely because a material is deemed too expensive today in initial cost or manufacturing cost to be of practical importance is no reflection on its protective power, which may be of a high order.

I claim:

1. Free flowing finely divided dry sulphur containing about 1% of a carbo-cyclic organic compound containing nitrogen in combined form to impart basic properties to said compound, said compound being a liquid at about 120° C. and a solvent for sulphur and soluble in molten sulphur.

2. Free flowing finely divided dry sulphur containing about 1% of a basic carbo-cyclic organic compound containing nitrogen in combined form to impart basic properties to said compound, said compound having a boiling point close to or above 120° C. and being a solvent for sulphur and soluble in molten sulphur.

3. A method of producing a free flowing finely divided dry sulphur comprising distributing through a mass of molten sulphur about 1% of a carbo-cyclic organic compound soluble in said sulphur and containing nitrogen in combined form to impart basic properties to said compound, cooling said mass and dry grinding said cooled mass to finely divided form.

4. Free flowing finely divided sulphur containing about 1% of aniline.

5. Free flowing finely divided sulphur containing about 1% of benzanilide.

JOHN B. CECCON.